Dec. 17, 1968  R. H. MESINGER  3,416,838
CYCLE SADDLE CONSTRUCTION
Filed Jan. 17, 1967  2 Sheets-Sheet 1
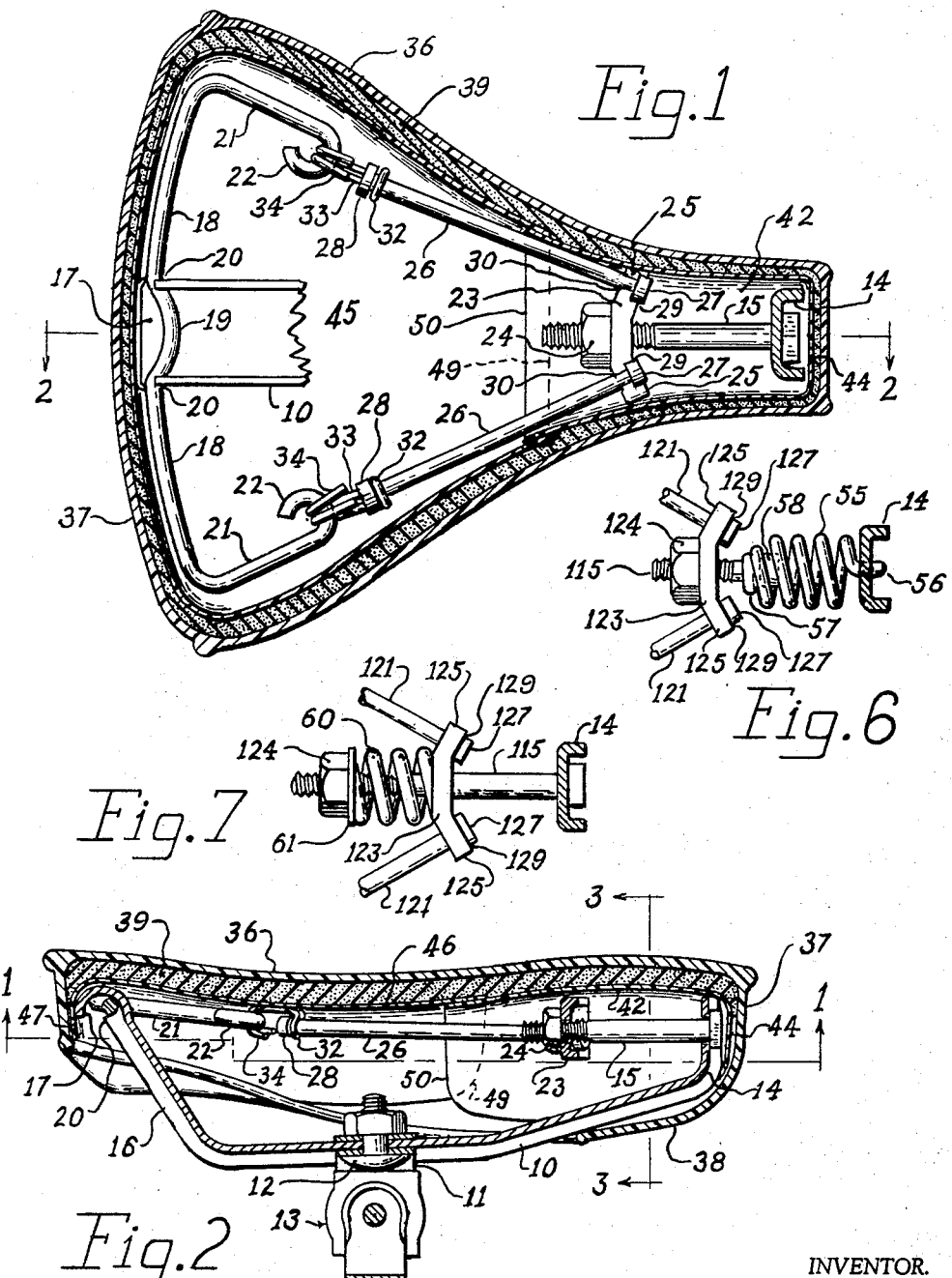
INVENTOR.
Robert H. Mesinger
BY
William F. Mesinger
ATTORNEY -

Dec. 17, 1968    R. H. MESINGER    3,416,838
CYCLE SADDLE CONSTRUCTION
Filed Jan. 17, 1967    2 Sheets-Sheet 2
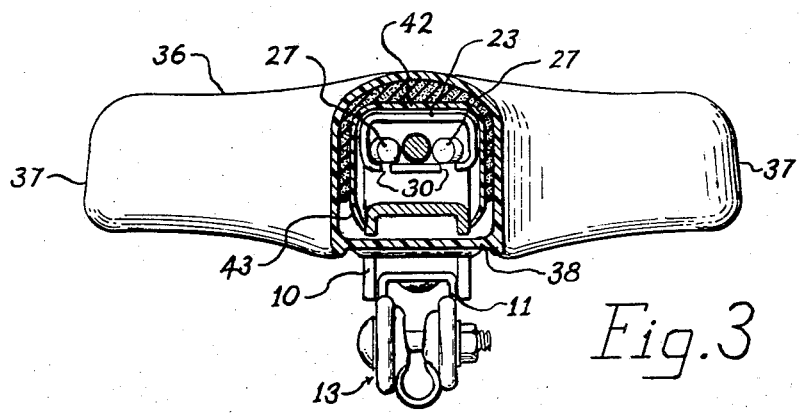
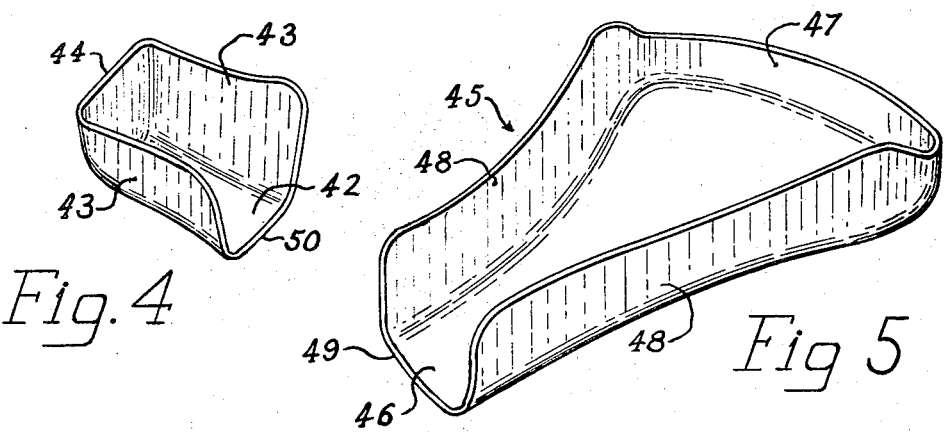
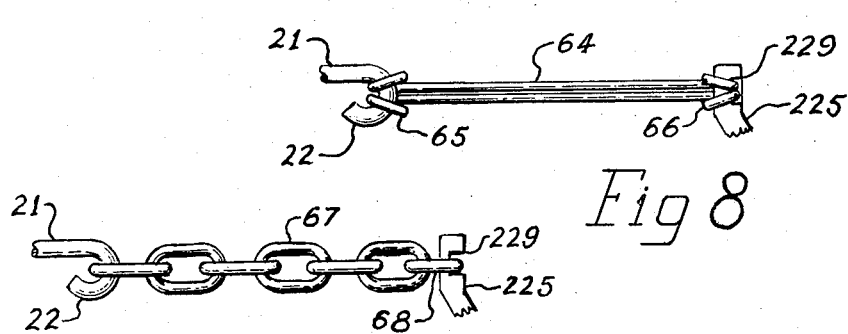
INVENTOR.
Robert H. Mesinger
BY William F. Mesinger
ATTORNEY

United States Patent Office 3,416,838
Patented Dec. 17, 1968

3,416,838
CYCLE SADDLE CONSTRUCTION
Robert H. Mesinger, Lake Crest Drive, Aunt Hack Ridge,
Danbury, Conn. 06810
Filed Jan. 17, 1967, Ser. No. 609,817
10 Claims. (Cl. 297—214)

ABSTRACT OF THE DISCLOSURE

A bicycle saddle seat supporting undercarriage construction having a rigid fore and aft extending frame member securable to a seat post and a horizontally laterally extending cantle member secured at its middle to the rear of the frame member; the laterally extending portions of the cantle member being of stiff spring material to resist forward pull. Rod like members are secured between the resiliently displaceable cantle ends and the front end of the frame member. The cantle member and rod like members providing resilient suspension type support for the seat material thereon.

---

This invention relates to saddles for use on bicycles and similar seating uses, and more particularly to a new and useful undercarriage construction for supporting the seating surface of saddles.

There is hereby provided a saddle undercarriage construction for more comfortably and adjustably supporting the generally pear shaped flexible material seating surface or top material of a bicycle or like saddle. This is achieved principally by a novel rear transverse cantle member having bow spring properties wherein the horizontally laterally extending spring end portions are secured to forwardly extending resilient top supporting suspension members that have their forward ends secured adjustably to the forward end of a stiff fore and aftly extending main frame memper, to the rear end of which the midportion of the cantle member is secured.

A widely used type of saddle undercarriage has a stiff pressed sheet metal plate for supporting the seating surface and even though a reasonable thickness of padding is used between the plate and the seating surface cover, the padding compresses to a fixed bottom under pressure of the body of a rider and the result is a hard bottoming seat at the pressure areas which are in the area of the ischia bones of the body.

This inherent disadvantage is avoided in part by the so called mattress type undercarriage which has a large number of small diameter coil springs stretched between a rigid rear cantle member and a forward nose piece which provide a mattress like support under the seating surface of the top cover. An example of such construction is shown in the drawings of U.S. Patent 3,077,363 to Robert H. Mesinger. This construction however can be made for only one weight class of rider because there is no tension adjustment and if the nose piece position were made adjustable, the long coil springs would change tension too little to provide a noticeable change in the resistance to vertical displacement.

Principal objects of the present invention are to provide a saddle underframe construction which avoids the above descriped objections; which provides the vertical body supporting advantages of the mattress type saddle while also being adjustable by the user to provide a desired vertical resistance to displacement of the seating area; wherein the stiffness of the seating surface support can be readily preselected without changing any parts by mere adjustment of a single part; which employs a novel cantle member which not only provides near peripheral support but which also functions to provide resilient cantilever spring action of its outer ends for stretching longitudinal top supporting members; which has vertical body supporting advantages of the mattress type construction but which has less complexity of parts and which can be manufactured at less cost by mass production procedures; and which provides a saddle undercarriage of lighter weight than the undercarriages of saddles of similar seating sizes.

Other objects and advantages of the invention will be apparent from the following description having reference to the drawings in which:

FIG. 1 is a bottom view of a saddle with an undercarriage according to an embodiment of the invention, the view being of a section taken along lines 1—1 of FIG. 2;

FIG. 2 is a side view of a section along line 2—2 of FIG. 1;

FIG. 3 is a front view of a section taken along line 3—3 in FIG. 2;

FIGS. 4 and 5 are perspective views of front and main portions of a formed shell which is positioned between the support frame and the saddle cover;

FIGS. 6 and 7 are fragmentary bottom views of alternative constructions at the forward portion of the support frame, the seat cover and shell being removed; and FIGS. 8 and 9 are fragmentary bottom views of alternative cantle to yoke connecting members.

According to a preferred embodiment of the invention, there is provided a seat supporting frame or undercarriage which comprises a main longitudinal frame member 10 that is preferably made of steel and has structurally stiff cross sectional form such as the structual channel shape shown. The mid portion of frame member 10 has secured thereto a means for mounting the saddle adjustably on the customary types of seat posts of a vehicle or bicycle. This may comprise a U shaped member 11 secured to the member 10 by a bolt 12 and having its legs extending downward to carry a standard seat post clamp assembly 13. The forward extending portion of the frame member 10 rises upwardly to a vertical forward end portion 14 which has a hole for receiving a longitudinal tension adjusting means preferably in the form of a headed bolt 15. The rearward portion 16 of frame member 10 extends at a sharper angle to a point inside the rear edge of the saddle top assembly described hereinafter, and the rear end 17 is formed and shaped to securely engage a novel cantle member 18.

In the preferred embodiment, the cantle member 18 is made of spring steel rod material and may have a forwardly displaced mid portion 19 cooperating with the curved-over end 17 of the frame member 10 and with notches 20 cut in the side flanges of the frame member. The cantle member 18 rear portion is curved according to the shape of the rear of the saddle cover and at the lateral ends of the curved portion, the cantle member is bent to provide angularly inwardly directed and forwardly extending portions 21, the ends of which are formed to provide eyes or hooks 22. A yoke 23 is carried by the bolt 15 which passes through a hole in the middle of the yoke, there being a tension adjusting nut 24 cooperating with the bolt threads on the rearward side of the yoke 23. This yoke has laterally extending wing portions 25 to which are secured the forwardly extending longitudinal rod portions 26 of the frame.

These portions 26 may take the form of somewhat resilient rods made of a suitable plastic such as a high density polyethylene with heads 27 and 28 formed at each end. The forward heads 27 are nested and held by tension in sockets 29 formed in the forward sides of the yoke wings 25 there being slots 30 in the bottom of the yoke wings 25 of sufficient width to allow the shank portions of the rods 26 to be snapped into place when the frame is assembled. The rear heads 28 cooperate with means for securing the rods to the cantle portions 21 in the form of stiff wire hooks having a loop portion 32 around a rod 26 under the head 28, longitudinal portions 33 extending rearwardly and having end hooks 34 linked with the hooks 22.

This frame system is tensioned by taking up on the nut 24 so that the degree of resilience of the seating surface supported by the frame is adjustable according to the weight and desires of the rider. The resilience is mainly supplied by the cantilever or bow spring action of the left and right portions of the cantle member 18; the higher the horizontal tension in the frame parts 21, 33, 26, yoke 23 and bolt 15, the greater will be the resistance to downward pressure on the seating areas of the saddle.

The seating surface may be formed by any suitable saddle frame cover, for example a cover of the type shown and described in U.S. Patent No. 3,077,363 to Robert H. Mesinger. This is a vinyl base plastic flexible cover having walls of substantially uniform thickness. The cover has the customary saddle shaped top 36, downwardly depending side walls 37 and a bottom wall 38 with an opening therein sufficiently large to permit the cover to be stretch forced onto the farme. Under the top portion 36 there may be a cushion layer 39 such as a foam rubber pad. The pad 39 in turn is supported on a flexible sheet material shell 42–45 that fits over and encloses the top parts of the entire supporting frame. This shell can be made in one piece of sheet material formed to have downward extending peripheral flanges. In the embodiment shown in the figures and in detail in FIGS. 4 and 5, the shell is made in two overlapping parts; the forward shell part 42 is made to enclose front parts of the frame and has downward extending side flanges 43 poined to a front flange 44. Shell part 42 rests on the front end 14 of frame member 10 and on the top of the yoke 23. The main rearward shell part 45 has a top wall 46 which rests on the cantle member 18, the forward portions 21, and rods 26 and has a rear flange 47 and side flanges 48. The forward edge 49 of shell part 45 overlaps the rearward edge 50 of shell part 42 to provide some relative movement for flexibility. The shell or shell parts 42 and 45 may be formed of any suitable material such as thin resilient metal but the material is perferably a somewhat stiff plastic such as a polyethylene which is lighter, frictionally noiseless, and non rustable. The thickness of the shell material and its resilient stiffness is selected to cooperate with the tension members of the frame to provide adequate vertical resilience but stiff enough to prevent excessive sagging of the top in the central seating areas.

As previously mentioned the shell can be a single unitary part for certain types of bicycle saddles such as the racing type employing the support frame according to this invention. For racing type saddles a spring system interposed between the frame member 10 and a seat post securing means is not desirable since the saddle is used more for guiding the bicycle when racing than for vertical support of the rider. However, the top support comfort is provided where it is most needed, that is, in the areas of the top under the ischia bone areas of the rider's body. These areas of the saddle top are about one quarter forward the lateral edges. The present construction provides adequate resilient support in these areas and the stiffness can be adjusted at will.

An alternative construction is shown in FIG. 6 wherein a helical tension spring 55 is used to provide resilient longitudinal supplementary tensil force. The spring has a hook loop 56 formed on its front end which is engaged through a hole in the end 14 of the frame member 10. The rear end of the spring has a turn 57 of smaller diameter engaged around the neck of bolt 115 under its head 58. The bolt 115 passes thru the central hole of yoke 123 and is secured by the nut 124 which can be adjusted to vary the tension provided by the spring 55.

A further alternative is illustrated in FIG. 7 wherein the spring 60 is a compression spring surrounding the bolt 115 and is positioned between the yoke 123 and a washer 61 under the nut 124. Tightening the nut 124 increases resilient force on the yoke 123 which in turn increases the tensil forces in the rod portions 121 which are resiliently resisted by the lateral cantilever spring portions of cantle member 18.

When the adjustable spring arrangements of FIGS. 6 or 7 are used, there need not be a joint between the forward extensions 21 of the cantle member and the rods 26 but the cantle member extensions 21 are then extended all the way to the yoke 123, as indicated at 121 in FIGS. 6 and 7. The forward ends 127 of the extensions 121 are sharply bent or headed over to be anchored in the socket holes 129 in the yoke wings 125. When the spring loaded adjustment of FIGS. 6 or 7 is used, it is found that the cantle member 18 can be of stiffer material which will have the advantage, when used for wide saddles, of allowing less lateral tilting of the saddle by downward pressure on one lateral side of the saddle top.

FIGS. 8 and 9 illustrate fragmentarily, alternative means for connecting the cantle extensions 21 to the yoke wings 225. On FIG. 8 spring wire rods 64 are used having hook ends 65 engaging the hooks 22 and forward hooks 66 engaging through socket holes 229 in yoke wings 225. In FIG. 9 a link chain 67 is linked to each of hooks 22 and connected by a closeable link 68 through the hole 229 in yoke wing 225.

From the above description it will be seen that a novel tensil suspension top support is provided which employs instead of a rigid cantle member, the cantle member 18 that has bow spring action wherein the lateral parts act as cantilever springs to resiliently resist the horizontal pull of the forwardly extended top support members or rods 26. That the rods 26 are pulled forwardly by a horizontally adjustable means comprising a simple bolt 15, yoke 23 and nut 24. That this horizontal tension is resisted at both ends by a novel single frame member 10 which supports at its ends 16 and 14 the cantle member 18 and the bolt 15; this frame member 10 being a steel stamping manufactured at low cost. The entire undercarriage may be assembled quickly and easily, requiring only one unit to be turned and adjusted. The seat post clamp can be positioned forwardly or rearwardly with respect to frame member 10 by simply providing a series of bolt holes in the horizontal part of member 10.

It will be further noted that the weight of the saddle undercarriage is considerably less than the weight of the undercarriage in similar size saddles of customary former construction and this is due inter alia to the use of a single stamped and formed metal frame member 10 which is so cross sectioned to provide strength and stiffness with a minimum amount of metal; to the use of only two forwardly extending members such as rods 26 which may be chosen for lightness of weight with sufficient tensil strength; and to the use of relatively thin flexible and light weight sheet material for the shell parts 42 and 45.

Instead of the single frame member 10, it is contemplated that a customary frame construction using reach members similar to the construction of said Patent No. 3,077,363 can be used with the novel suspension member construction according to this invention so that rear coil springs are interposed under the cantle support member and the seat post clamp carrying members.

It is to be understood that these and other constructional variations can be made without departing from the spirit and scope of the invention as hereinafter claimed.

What is claimed is:

1. A saddle undercarriage comprising longitudinal frame member means providing front and rear supports of substantially fixed separation; a cantle member secured to the rear support and having horizontal laterally extending cantilever spring portions; longitudinally adjustable securing means connected to the front support; and tensil suspension means secured forwardly to said longitudinally adjustable securing means and rearwardly to the outer portions of said cantilever spring portions and supporting the top portion of a saddle.

2. A saddle undercarriage according to claim 1 in which said longitudinally adjustable securing means is connected to the front support by a tension coil spring and threaded bolt and nut which nut may be turned to change the tension of said spring.

3. A saddle undercarriage according to claim 1 in which said longitudinally adjustable securing means is connected to the front support by a bolt carrying a compression coil spring on the rear of the securing means and a threaded nut on the bolt which compresses the spring adjustably.

4. A saddle undercarriage according to claim 1 in which said tensil suspension means comprises horizontal plastic rods connected in front to said longitudinally adjustable securing means and at rear to said cantilever spring portions.

5. A saddle undercarriage according to claim 1 in which said tensil suspension means comprises horizontal forwardly extending extensions of cantilever spring portions and having forward ends connected to said longitudinally adjustable securing means.

6. A saddle undercarriage according to claim 1 in which a shell like cover of relatively thin and flexible sheet material is positioned with a top supporting area on said cantle member, said securing means and said tensil suspension means, said shell having peripheral down turned edges.

7. A saddle undercarriage according to claim 1 in which said longitudinal frame member is of steel having a channel shape, a substantially horizontal mid portion adapted to carry seat post clamping means and upwardly directed front and rear portions the front portion being adapted to be connected to longitudinal tension adjusting means and the rear portion being constructed to receive and hold the central portion of said cantle member.

8. A saddle undercarriage comprising longitudinal frame member means providing front and rear supports of substantially fixed separation; a cantle member secured to the rear support; securing means connected to the front support; suspension support means connected forwardly to said securing means and rearwardly to said cantle member; and a shell-like cover of relatively thin flexible sheet material positioned on and supported by said cantle member said securing means and said suspension support means, said shell having peripheral down-turned edges and an upper surface adapted to support a saddle top seating material, the thickness and resilient flexible stiffness of the shell material being selected to cooperate with said suspension support means to provide therewith desired vertical resilience and stiffness sufficient to prevent sagging of the top seating material in pressure areas during use of the saddle.

9. A saddle undercarriage according to claim 8 in which said shell is made of a plastic.

10. A saddle undercarriage according to claim 8 in which said shell is made of a plastic and comprises forward and rearward parts which overlap in sliding engagement.

References Cited

UNITED STATES PATENTS

| | | | |
|---|---|---|---|
| 500,158 | 6/1893 | Sager | 297—204 |
| 511,363 | 12/1893 | Sager | 297—204 |
| 823,916 | 6/1906 | Brooks et al. | 297—204 X |
| 1,130,606 | 3/1915 | Jelley | 297—204 X |
| 1,391,409 | 9/1921 | Roberts | 297—204 |
| 3,077,363 | 2/1963 | Mesinger | 297—214 |
| 3,131,969 | 5/1964 | Kalter | 297—214 |

JAMES T. McCALL, *Primary Examiner.*

U.S. Cl. X.R.

297—195